(12) United States Patent
Strandjord et al.

(10) Patent No.: US 8,077,322 B2
(45) Date of Patent: Dec. 13, 2011

(54) SIGNAL CONDITIONING TO PROVIDE OPTIMUM GAIN AND NOISE REDUCTION FOR RESONATOR FIBER OPTIC GYROSCOPES

(75) Inventors: Lee Strandjord, Tonka Bay, MN (US); Norman Gerard Tarleton, Glendale, AZ (US); Stephan Enzone, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 469 days.

(21) Appl. No.: 12/415,836

(22) Filed: Mar. 31, 2009

(65) Prior Publication Data
US 2011/0181886 A1    Jul. 28, 2011

Related U.S. Application Data

(60) Provisional application No. 61/158,734, filed on Mar. 9, 2009.

(51) Int. Cl.
*G01B 9/02* (2006.01)
(52) U.S. Cl. .................................................. 356/475

(58) Field of Classification Search .................. 356/477, 356/474, 475, 459–461
See application file for complete search history.

(56) References Cited

U.S. PATENT DOCUMENTS

| 5,469,257 A | 11/1995 | Blake et al. |
|---|---|---|
| 5,774,216 A | 6/1998 | Priddy et al. |
| 6,765,678 B2 | 7/2004 | Strandjord et al. |

*Primary Examiner* — Hwa Lee
(74) *Attorney, Agent, or Firm* — Fogg & Powers LLC

(57) ABSTRACT

A resonator fiber optic gyroscope includes a first light source configured to generate a light signal. A resonator element is configured to generate an optical signal based on the light signal. A photodetector is configured to generate a first electrical signal based on the optical signal. The first electrical signal includes an oscillating signal, a direct-current (DC) signal, an even-harmonic signal including components at even harmonics of the oscillating signal, and an odd-harmonic signal including components at odd harmonics of the oscillating signal. A filtering element is configured to attenuate the DC signal, at least one even-harmonic component, and an odd-harmonic component to produce a second electrical signal. An amplifier is configured to amplify the second electrical signal. An analog-to-digital converter (ADC) is configured to digitize the amplified second electrical signal.

17 Claims, 4 Drawing Sheets

SIGNAL CONDITIONING TO PROVIDE OPTIMUM GAIN AND NOISE REDUCTION FOR RESONATOR FIBER OPTIC GYROSCOPES

PRIORITY CLAIM

This application claims priority to U.S. Provisional Application No. 61/158,734 filed on Mar. 9, 2009 entitled "METHOD FOR SIGNAL CONDITION TO PROVIDE OPTIMUM GAIN AND NOISE REDUCTION FOR RESONATOR FIBER OPTIC GYROSCOPES," which is herein incorporated by reference in its entirety.

STATEMENT OF GOVERNMENT INTEREST

This invention was made with Government support under Contract No. N00014-06-C-00001 awarded by the Office of Naval Research. The Government has certain rights in the invention.

BACKGROUND OF THE INVENTION

The resonator fiber optic gyroscope (RFOG) has the potential of meeting the needs of many navigation and rotation sensing markets and creating new markets because of its capability of high performance in a small size, at low power and low cost. FIG. 1 illustrates a conventional RFOG 10 consisting of a clockwise (CW) laser 12, a counter-clockwise (CCW) laser 14, a fiber optic resonator 16 and electronic circuits ("electronics") providing at least resonator-coupling and resonance-tracking (or resonance-detection) functionality. The CW laser 12 inputs light into the resonator 16 and a CW photodetector 18 detects the CW output of the resonator.

The electronics downstream of the CW photodetector 18, which include a CW modulation generator 20, a CW demodulator 22, a CW accumulator 24, and a summing element 26, control the CW laser frequency to a resonance frequency of the resonator 16. The resonance frequency is detected by modulating the laser frequency at $f_1$ using the CW modulation generator 20 and then demodulating the output of the CW photodetector 18 at $f_1$ using the CW demodulator 22. At the resonance frequency, the CW photodetector 18 signal at $f_1$ passes through zero amplitude. The CW accumulator 24 controls the laser frequency via the CW laser driver 38 to the resonance frequency by adjusting the laser frequency until the output of the CW demodulator 22 is zero. The modulation at $f_1$ is electronically summed with the CW integrator 24 output by the summing element 26. With regard to the similarly configured CCW path of the RFOG 10, the CCW laser 14 is controlled to the CCW resonance frequency in a similar manner, except it is common that the modulation frequency $f_2$ is different than $f_1$ to eliminate errors that arise when light from one direction of propagation in the resonator 16 inadvertently couples into the other direction.

In order to achieve high performance, the RFOG electronics must be capable of digitizing and detecting a very small signal from the resonator 16 and at specific frequency in the presence of a very large unwanted (e.g., harmonic) signal. The required resolution cannot be obtained with conventional analog-to-digital converters (ADCs) alone, and therefore some type of filter, to remove the unwanted signal to allow additional gain of the rotation signal so that conventional ADCs can be used, would be desirable. Ideally, such a filter removes the unwanted signal without removing noise that is required for ADC bit interpolation.

SUMMARY OF THE INVENTION

In an embodiment, a resonator fiber optic gyroscope includes a first light source configured to generate a light signal. A resonator element is configured to generate an optical signal based on the light signal. A photodetector is configured to generate a first electrical signal based on the optical signal. The first electrical signal includes an oscillating signal, a direct-current (DC) signal, an even-harmonic signal including components at even harmonics of the oscillating signal, and an odd-harmonic signal including components at odd harmonics of the oscillating signal. A filtering element is configured to attenuate the DC signal, at least one even-harmonic component, and an odd-harmonic component to produce a second electrical signal. An amplifier is configured to amplify the second electrical signal. An analog-to-digital converter (ADC) is configured to digitize the amplified second electrical signal.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment provides an optimum accommodation of signal rejection and passing noise for ADC bit interpolation by splitting a gyro signal into two paths, applying a filter in a first path that is optimized for unwanted signal rejection and a filter in a second path that is optimized for passing only noise necessary for good ADC bit interpolation, then recombining the two paths before ADC processing.

Figure 1:
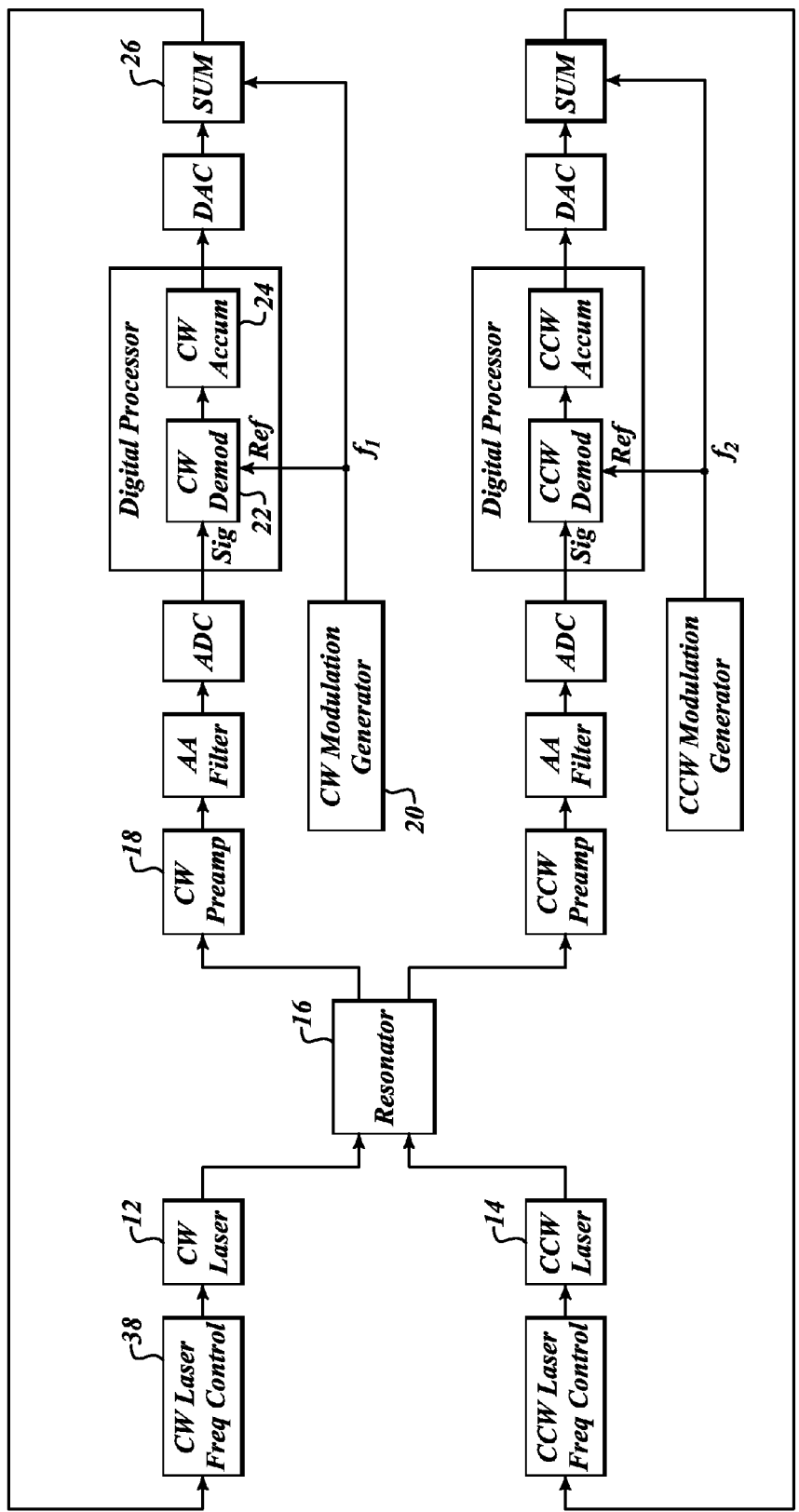
FIG. 1 illustrates a conventional RFOG.
Figure 2:
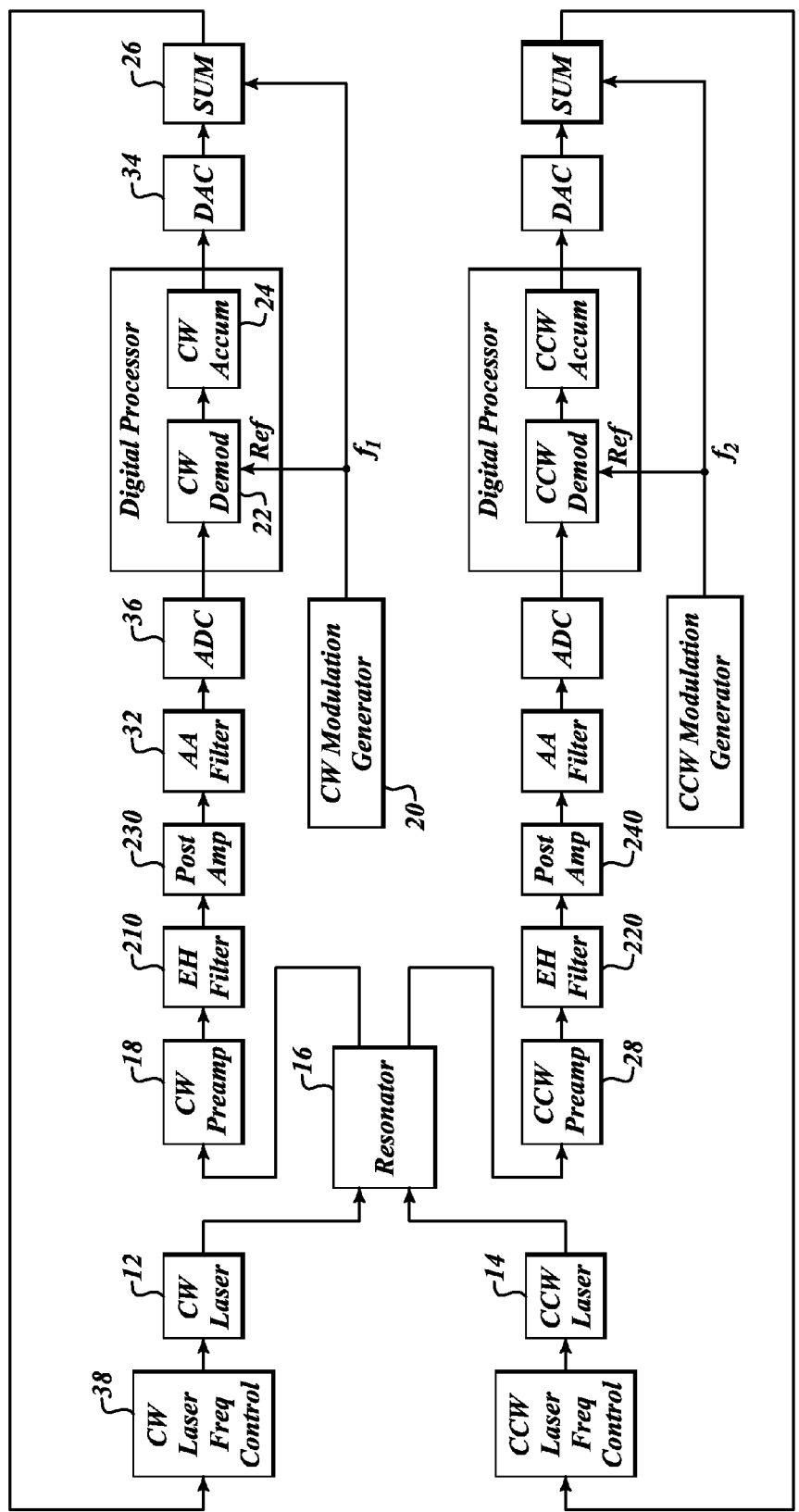
FIG. 2 illustrates an RFOG according to an embodiment of the invention.

FIG. 2 illustrates an RFOG 200 according to an embodiment of the invention. Elements of the RFOG 200 illustrated in FIG. 2 (as well as FIG. 4) similar or identical to those elements illustrated in FIG. 1 are designated with like reference numerals. For ease of illustration, the following discussion is presented, at least primarily, in the context of the CW path and its constituent elements illustrated in FIG. 2. It is to be understood that the same or similar principles apply equally to the CCW path illustrated in FIG. 2.

For an ideal resonator, the difference in the CW and CCW resonance frequencies is proportional to rotation rate of the RFOG. To achieve full performance potential, the resonance frequencies must be determined with high precision. The RFOG employs a modulation/demodulation technique, employing, for example, the generator 20 and demodulator 22, to determine the resonance frequencies.

To provide a signal that is indicative of a deviation from the resonance frequency, the frequency of the CW and CCW lasers 12, 14 are modulated. The frequency modulation sweeps the laser frequency relative to the resonance frequency. The resulting output of the resonator CW and CCW preamps (photodetectors 18, 28 that convert resonator output light intensity to an electrical signal) depends on where the average laser frequency lies relative to the resonance frequency. If the average laser frequency deviates from the resonance frequency, then a signal at the modulation frequency is present. The sign or phase of the signal depends on which direction the average laser frequency deviates from the resonance frequency. When the average laser frequency is exactly on resonance, then the amplitude of the signal at the modulation frequency, and odd harmonics thereof, is zero. Therefore the resonance frequency is detected by detecting a null of the signal at the modulation frequency.

A synchronous demodulator is typically used to detect the resonator output signal at the modulation frequency. Synchronous demodulation provides significant rejection of other signals and noise that does not occur at the modulation frequency. A synchronous demodulator is also sensitive to the phase of the demodulator input signal and thus provides an output that has a sign that indicates the direction that the average laser frequency deviates from the resonance frequency. Synchronous demodulation can be performed by an analog mixer; however this may result in large sensing errors due to imperfections of the analog mixer. For example, even if there is no signal at the modulation frequency going into the analog mixer, the output of the mixer may have some offset due to imperfections. The offset will translate to a gyro rate bias error. Significant performance improvements can be realized by using a digital demodulator, which does not have offset errors like the analog mixer.

To employ a digital demodulator the resonator signal from the preamp must be digitized by an analog-to-digital converter (ADC) 36. Typically an anti-aliasing (AA) filter 32 is placed in-front of the ADC to reduce the effects of signal and noise aliasing, which is accomplished by providing signal attenuation at and above the ADC sample frequency.

A servo may be used to maintain the average laser frequency at the resonator resonance frequency. The servo controls the laser frequency to the resonance frequency such that the demodulator output is held at zero. A servo can consist of an analog integrator, but like the analog demodulator, an analog mixer has imperfections that can lead to rotation sensing errors. An example is an effective integrator input voltage offset, which will cause the integrator to move the average laser frequency slightly off resonance to generate a demodulator output that cancels out the integrator input offset. To improve gyro performance, a digital approximation of an integrator (e.g., accumulator 24) can be employed. The output of the accumulator 24 can be converted back to analog by a digital-to-analog converter (DAC) 34 before being sent to the laser frequency control circuit 38. The DAC 34 output may also be summed with the modulation generator 20 output, which provides modulation of the laser frequency.

Digitizing the preamp signal may introduce quantization noise associated with the ADC 36. The ADC quantization noise will result in higher angle random walk (ARW), which is a key performance parameter of the gyro. The impact that ADC quantization noise has on ARW depends on the signal gain before the ADC 36. A higher signal gain reduces the impact on ARW. With enough signal gain, the quantization noise impact on ARW can be made insignificant. However, without changes to the configuration of the RFOG shown in FIG. 1, the amount of signal gain is limited by the direct-current (DC) preamp 18 output due to the time-average light intensity at the resonator 16 output, and the even harmonic signal that results from modulating over the resonance peak. Typically, to reduce quantization noise impact on ARW to required levels, an additional 20 dB to 30 dB of signal gain may be required over the limit imposed by DC preamp output due to the average light intensity and the even harmonic signal. Thus, it is desirable to reduce the DC and even-harmonic signals to allow additional gain before signal processing by the ADC 36.

Table 1 shows results from a calculation of the ratio of specific even harmonic amplitude to the second harmonic amplitude of the even harmonic signal.

TABLE 1

| Harmonic # | Ratio with SH (dB) |
|---|---|
| 2 | 0.0 |
| 4 | −15.5 |
| 6 | −31.1 |
| 8 | −46.6 |
| 10 | −62.2 |

Without additional filtering of the signal, the 2nd harmonic component of the even harmonic signal dominates and is what limits the additional gain. To obtain an additional gain of 30 dB, the even harmonic signal amplitude should be reduced by approximately 30 dB. The table shows that if only the 2nd harmonic is eliminated (such as using a notch filter with a notch frequency at the 2nd harmonic frequency, as discussed in greater detail below herein), then the 4th harmonic will limit the additional gain to about 15 dB. To obtain an additional gain of 30 dB, the Table 1 shows that at least the 2nd and 4th harmonics must be removed. Since the 6th harmonic is −31 dB down from the second, there is little design margin if 30 dB of additional gain is required; therefore, even rejection of the 6th harmonic is desirable.

Setting the cutoff frequency of the AA filter 32 with an appropriate roll-off just above the modulation frequency can achieve the desired rejection of the even harmonic signals. However, by doing so, another important criteria associated with the ADC may not be met; to meet performance requirements the required detection level of the resonator output signal at the modulation frequency is typically much less than the bit resolution of available ADCs. For an ideal case, if the average resonator signal is between two adjacent bits of the ADC, then a non-zero resonator signal will not be detected until its amplitude is large enough to be detected by either bit. This can lead to a deadband in the gyro rotation-sensing transfer function, or additional rotation sensing noise.

To overcome the resolution limitation of ADCs, a method known as noise dithering and over-sampling may be employed. With sufficient noise amplitude, adjacent ADC bits are always toggled even if the signal is in-between bits. The bit toggling provides a signal at the ADC 36 output that has an average duty cycle depending on the amplitude of the signal that lies between bits. The signal can be digitally reconstructed by averaging the ADC 36 output. To accurately reconstruct the signal with averaging, the ADC sample frequency must be greater than the frequency of the averaged samples, which in turn must be greater than the frequency of the signal to be reconstructed. Typically, in fiber optic gyros, the, ADC sampling frequency is at least 100 times greater than the signal frequency. It has been shown in the literature that to obtain accurate reconstruction of the ADC input signal, the total root mean square (RMS) amplitude of the ADC input noise should be at least ⅓ of the least significant bit (LSB) of the ADC. If the RMS noise amplitude is less than ⅓ LSB, then the noise dithering may not eliminate deadband in the gyro rotation sensing transfer function, or additional rotation sensing noise due to finite ADC resolution.

In practice, the resonator 16 signal has some wide-band noise due to many noise sources, such as photon shot noise. The wide-band noise can be used to provide a dither signal to the ADC 36. To provide enough noise at the ADC 36 to meet the ⅓ LSB criteria, the noise bandwidth from the preamp 18 to the ADC 36 may be approximately 1 MHz. A typical modulation frequency for an RFOG ranges from 20 kHz to about 200 kHz. If the cut-off frequency of the AA filter 32 is set to just above the modulation frequency, then the AA filter will limit the noise bandwidth to much less than required, and therefore there will not be enough noise at the ADC 36 input for bit interpolation. Thus, it is desirable to reject at least the 2nd, 4th and 6th harmonics of the even harmonic signal while providing enough noise amplitude at the ADC input.

Referring to FIG. 2, an embodiment includes respective filtering elements 210, 220 and amplifiers 230, 240 employed in the CW and CCW paths of the RFOG 200. In an embodiment, the filtering elements 210, 220 may include a notch filter, or a series of notch filters, that reject an even-harmonic component of the even-harmonic signal. For example, one notch filter may be set to reject the 2nd harmonic, another notch filter for the 4th harmonic, another notch filter for the 6th harmonic, etc. This approach can provide the desired attenuation of the even-harmonic signal to allow the desired additional gain provided by amplifiers 230, 240 without saturating the electronics of the RFOG 200. However, the notch filters may pass noise at the odd harmonics of the signal. Noise at these frequencies can increase ARW if a square-wave digital demodulator is employed. A square-wave demodulator is commonly used in FOG signal processing because of its simplicity requiring very few digital gates in the digital processor chip.

A square-wave demodulator is not only sensitive to a signal at the modulation/demodulation frequency, but also odd harmonics of the modulation frequency. The square-wave demodulator sensitivity to an odd harmonic is inversely proportional to the harmonic number n. Equation 1 shows how noise at the modulation odd harmonics contributes to the total gyro ARW:

$$ARW = k\sqrt{S_{in}} \sqrt{\sum_{n=0}^{n=n_{max}} \frac{1}{(2n-1)^2}} \qquad \text{Eq. 1}$$

The ADC input noise density is $S_{in}$, which is assumed to be constant over all frequencies, and n is the odd harmonic number, and k is a proportionality constant. The minimum (best) ARW is obtained if the noise at the odd harmonics is removed. An exemplary approach is to set the AA filter 32 cutoff frequency low enough to remove noise at the 3rd harmonic and above. However, the AA filter 32, with such a low frequency cutoff, may also remove noise required for ADC bit dithering. Equation 2 shows what happens to ARW if only the lower odd harmonics are removed:

$$ARW = k\sqrt{S_{in}} \sqrt{1 + \sum_{n=n\_min}^{n=n\_max} \frac{1}{(2n-1)^2}} \qquad \text{Eq. 2}$$

Where n_min is the lowest odd harmonic that is allowed to pass. Table 2 shows the fractional increase in ARW for various n_min.

TABLE 2

| n_min | Noise Factor |
|---|---|
| 3 | 1.109 |
| 5 | 1.057 |

TABLE 2-continued

| n_min | Noise Factor |
|---|---|
| 7 | 1.038 |
| 9 | 1.028 |
| 11 | 1.022 |
| 13 | 1.018 |
| 15 | 1.015 |
| 17 | 1.013 |
| 19 | 1.011 |
| 21 | 1.010 |
| 23 | 1.009 |

For n_min=3, noise at all odd harmonics are allowed to pass to the ADC 36 and the ARW is increased by about 11%. If noise at the 3rd harmonic is removed, (n_min=5), then the ARW is increased by only about 6%. After removing noise at the 3rd through 19th harmonics, any additional removal of higher harmonics has insignificant (i.e., less than 1%) impact on ARW. Therefore, besides rejecting the 2nd, 4th and 6th harmonics of the even harmonic signal, and passing enough noise for ADC bit dithering, the filtering elements 210, 220 may advantageously reject noise from about the 3rd to the 19th harmonic of the modulation frequency, but can pass noise above the 19th harmonic. A transfer function provided by filtering elements 210, 220 according to an embodiment is shown graphically in FIG. 3. FIG. 4 illustrates a configuration of filtering element 210 (as well as filtering element 220) according to such an embodiment.

In the embodiment illustrated in FIG. 4, the preamp 18 signal includes an oscillating signal (e.g., f or $f_{mod}$), a direct-current (DC) signal, an even-harmonic signal including a set of components at even harmonics (e.g., 2f, 4f 6f etc.) of the oscillating signal, and an odd-harmonic signal including a set of components at odd harmonics (e.g., 3f 5f 7f, etc.) of the oscillating signal. At the filtering element 210, the preamp 18 signal is split into two paths. In one path, a Low-Frequency Bandpass Filter (BPF) 410 passes only a fundamental component (e.g., 1f) of the oscillating signal and rejects the DC signal, the even harmonic signal and noise at odd harmonics. In the other path, a High-Frequency BPF 420 passes enough noise (e.g., a subset of harmonic components above the 19th harmonic) for ADC 36 bit dithering, but rejects the DC signal, significant even harmonic signals (e.g., a subset of harmonic components below the 8th harmonic) and significant noise at odd harmonics (e.g., a subset of harmonic components including the 19th harmonic and below). The outputs of the two BPFs 410, 420 are summed together at a summing element, such as a summing amplifier 430, or a summing node of the amplifier 230. After amplification by the amplifier 230, the filtered signal may then be digitized by ADC 36.

Figure 3:
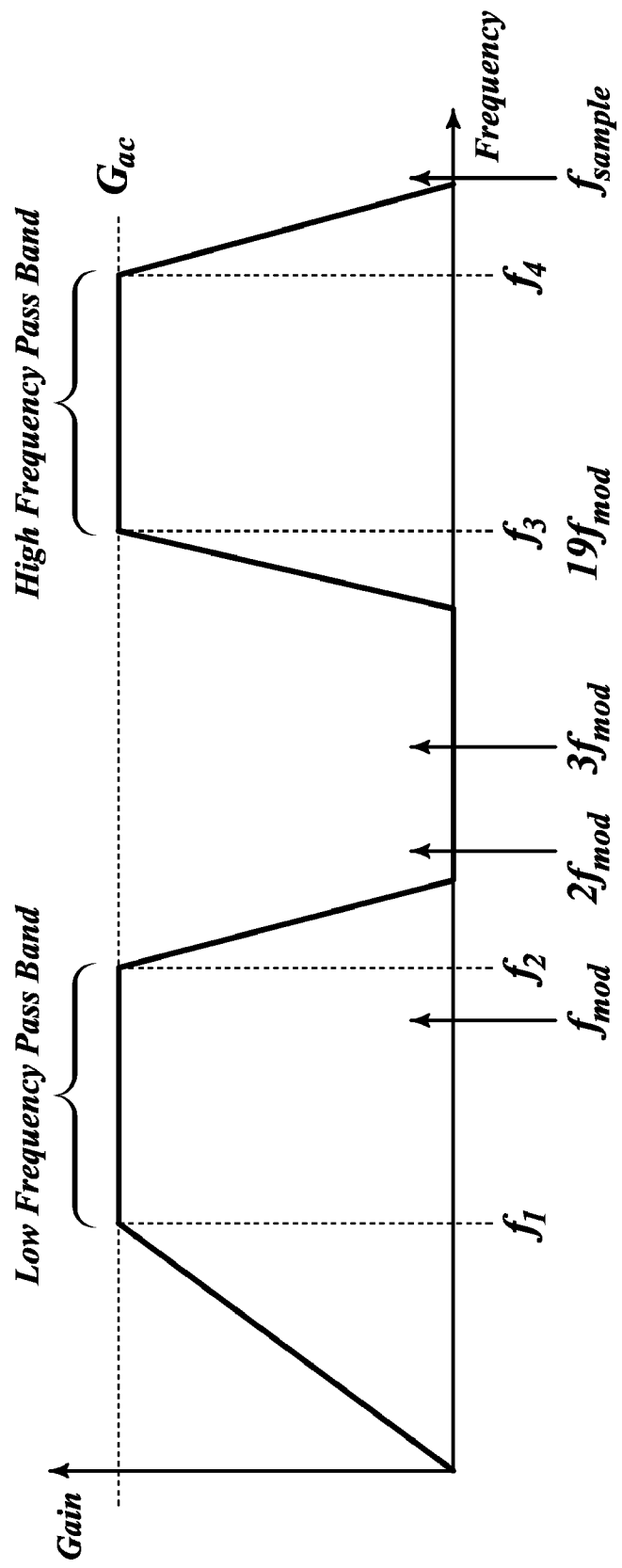
FIG. 3 illustrates a transfer function provided by filtering elements according to an embodiment of the invention.
Figure 4:
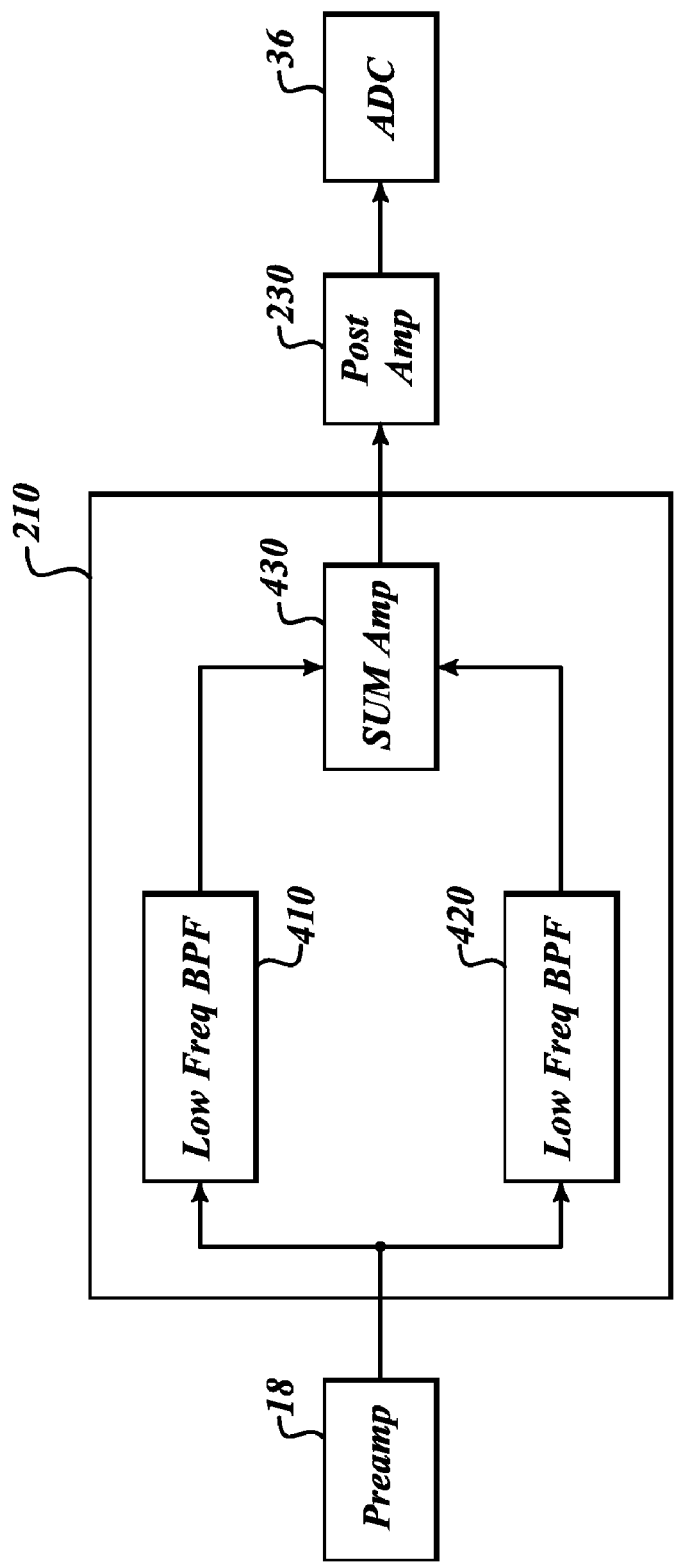
FIG. 4 illustrates components of the RFOG of FIG. 2.

Referring to FIG. 3, the gain of the filtering element 210 drops with lower frequencies below $f_1$ and goes to zero at DC to block any DC signal from the preamp 18. The gain reaches a maximum between $f_1$ and $f_2$ to pass the desired signal at the modulation frequency $f_{mod}$. Just above the modulation frequency $f_{mod}$ at $f_2$, the gain decreases with increasing frequency to provide the desired attenuation of the even harmonic signal and odd harmonic noise. To provide noise for ADC 36 bit dithering, the gain of the filtering element 210 increases again near the frequency $f_3$. The bandwidth between $f_3$ and $f_4$ determines how much noise is presented to the ADC 36 for bit dithering. In an embodiment, this bandwidth may be approximately 1 MHz to provide enough noise for bit dithering. The gain drops off after $f_4$ to provide attenuation at the ADC sampling frequency $f_{samp}$ to reduce the effects of aliasing.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A resonator fiber optic gyroscope, comprising:
   a first light source configured to generate a first light signal;
   a resonator element coupled to the light source and configured to generate a first optical signal based on the first light signal;
   a first photodetector coupled to the resonator element and configured to generate a first electrical signal based on the first optical signal, the first electrical signal including an oscillating signal, a first direct-current (DC) signal, a first even-harmonic signal comprising components at even harmonics of the oscillating signal, and a first odd-harmonic signal comprising components at odd harmonics of the oscillating signal;
   a first filtering element coupled to the first photodetector and configured to attenuate the first DC signal, at least one even-harmonic component of the first even-harmonic signal, and a first odd-harmonic component of the first odd-harmonic signal to produce a second electrical signal;
   a first amplifier coupled to the filtering element and configured to amplify the second electrical signal; and
   a first analog-to-digital converter (ADC) coupled to the amplifier and configured to digitize the amplified second electrical signal.

2. The gyroscope of claim 1 wherein the first filtering element comprises a first filtering component configured to produce a third electrical signal by:
   attenuating the first DC signal, the first even-harmonic signal and the first odd-harmonic signal; and
   passing a fundamental component of the oscillating signal, wherein the second electrical signal comprises the third electrical signal.

3. The gyroscope of claim 1 wherein the first filtering element comprises a first filtering component configured to produce a third electrical signal by:
   attenuating the first DC signal, the at least one even-harmonic component of the first even-harmonic signal, and the first odd-harmonic component of the first odd-harmonic signal; and
   passing a second odd-harmonic component of the first odd-harmonic signal, wherein the second electrical signal comprises the third electrical signal.

4. The gyroscope of claim 2 wherein the first filtering component comprises a low-frequency bandpass filter.

5. The gyroscope of claim 3 wherein the first filtering component comprises a high-frequency bandpass filter.

6. The gyroscope of claim 1 wherein the first filtering element comprises:
   a first filtering component configured to produce a third electrical signal by:
      attenuating the first DC signal, the first even-harmonic signal and the first odd-harmonic signal, and
      passing a fundamental component of the oscillating signal;
   a second filtering component configured to produce a fourth electrical signal by:
      attenuating the first DC signal, the at least one even-harmonic component of the first even-harmonic signal, and the first odd-harmonic component of the first odd-harmonic signal, and
      passing a second odd-harmonic component of the first odd-harmonic signal; and
   a summing element configured to sum the third and fourth electrical signals to produce the second electrical signal.

7. The gyroscope of claim 1 wherein the first filtering element is configured to pass a second odd-harmonic component of the first odd-harmonic signal to enable the ADC to perform a bit-interpolation function.

8. A resonator fiber optic gyroscope, comprising:
   a first light source configured to generate a first light signal;
   a resonator element coupled to the first light source and configured to generate a first optical signal based on the first light signal;
   a first photodetector coupled to the resonator element and configured to generate a first electrical signal based on the first optical signal, the first electrical signal including an oscillating signal and a first even-harmonic signal comprising components at even harmonics of the oscillating signal;
   a first filtering element coupled to the first photodetector and configured to attenuate at least one even-harmonic component of the first even-harmonic signal to produce a second electrical signal;
   a first amplifier coupled to the first filtering element and configured to amplify the second electrical signal; and
   a first analog-to-digital converter (ADC) coupled to the amplifier and configured to digitize the amplified second electrical signal.

9. The gyroscope of claim 8 wherein the first filtering element comprises at least one notch filter.

10. The gyroscope of claim 9 wherein the first filtering element comprises a plurality of notch filters in series, each notch filter of the plurality configured to attenuate a respective different even-harmonic component of the first even-harmonic signal.

11. A signal-conditioning circuit implementable in a resonator fiber optic gyroscope (RFOG), the RFOG including a first light source configured to generate a first light signal, a resonator element configured to generate a first optical signal based on the first light signal, a first photodetector configured to generate a first electrical signal based on the first optical signal, the first electrical signal including an oscillating signal, a first direct-current (DC) signal, a first even-harmonic signal comprising components at even harmonics of the oscillating signal, and a first odd-harmonic signal comprising components at odd harmonics of the oscillating signal, and a first analog-to-digital converter (ADC), the circuit comprising:
   a first filtering element configured to be coupled to the first photodetector and configured to attenuate the first DC signal, at least one even-harmonic component of the first even-harmonic signal, and a first odd-harmonic component of the first odd-harmonic signal to produce a second electrical signal; and
   a first amplifier coupled to the filtering element and configured to amplify the second electrical signal, wherein the first ADC is configured to digitize the amplified second electrical signal.

12. The circuit of claim 11 wherein the first filtering element comprises a first filtering component configured to produce a third electrical signal by:
   attenuating the first DC signal, the first even-harmonic signal and the first odd-harmonic signal; and passing a fundamental component of the oscillating signal, wherein the second electrical signal comprises the third electrical signal.

13. The circuit of claim 11 wherein the first filtering element comprises a first filtering component configured to produce a third electrical signal by:
   attenuating the first DC signal, the at least one even-harmonic component of the first even-harmonic signal, and the first odd-harmonic component of the first odd-harmonic signal; and
   passing a second odd-harmonic component of the first odd-harmonic signal, wherein the second electrical signal comprises the third electrical signal.

14. The circuit of claim 12 wherein the first filtering component comprises a low-frequency bandpass filter.

15. The circuit of claim 13 wherein the first filtering component comprises a high-frequency bandpass filter.

16. The circuit of claim 11 wherein the first filtering element comprises:
   a first filtering component configured to produce a third electrical signal by:
      attenuating the first DC signal, the first even-harmonic signal and the first odd-harmonic signal, and
      passing a fundamental component of the oscillating signal;
   a second filtering component configured to produce a fourth electrical signal by:
      attenuating the first DC signal, the at least one even-harmonic component of the first even-harmonic signal, and the first odd-harmonic component of the first odd-harmonic signal, and
      passing a second odd-harmonic component of the first odd-harmonic signal; and
   a summing element configured to sum the third and fourth electrical signals to produce the second electrical signal.

17. The circuit of claim 11 wherein the first filtering element is configured to pass a second odd-harmonic component of the first odd-harmonic signal to enable the ADC to perform a bit-interpolation function.

* * * * *